Figure 1:
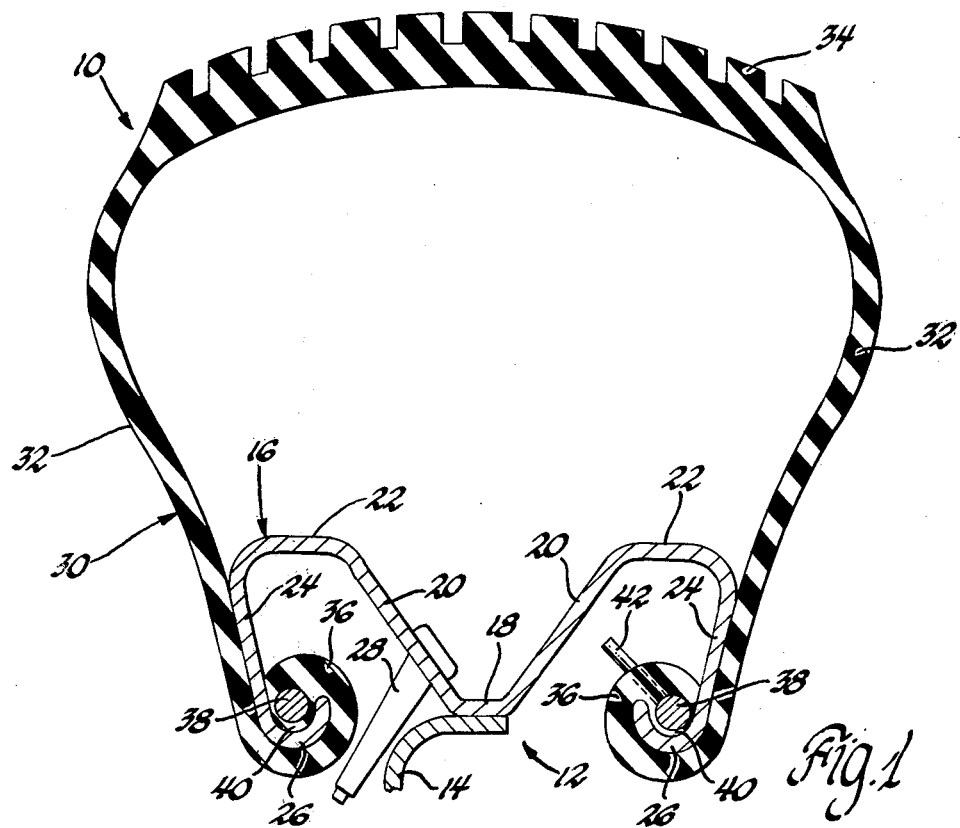

United States Patent [19]

Cataldo

[11] 4,169,496
[45] Oct. 2, 1979

[54] RUN-FLAT TIRE AND WHEEL ARRANGEMENT WITH INVERTED BEAD INTERLOCK

[75] Inventor: Roy S. Cataldo, Birmingham, Mich.

[73] Assignee: General Motors Corporation, Detroit, Mich.

[21] Appl. No.: 847,059

[22] Filed: Oct. 31, 1977

[51] Int. Cl.² .................. B60C 15/02; B60C 15/04
[52] U.S. Cl. ................................ 152/379.1; 152/399
[58] Field of Search ............ 152/158, 330 L, 330 RF, 152/400, 399, 353 R, 379.1, 158, 330 RF, 352, DIG. 11

[56] References Cited

U.S. PATENT DOCUMENTS 477,962   6/1892   Robertson .................. 152/379.1

FOREIGN PATENT DOCUMENTS 175535   11/1905   Fed. Rep. of Germany ........ 152/379.1
1169797   5/1964   Fed. Rep. of Germany ... 152/DIG. 11
2364274   6/1975   Fed. Rep. of Germany ........... 152/399

*Primary Examiner*—Trygve M. Blix
*Assistant Examiner*—Lawrence E. Williams
*Attorney, Agent, or Firm*—John P. Moran

[57] ABSTRACT

The drawings illustrate a tire and wheel arrangement wherein the wheel rim is formed to include radially outwardly diverging walls having annular "run-flat" shoulders formed on the outer periphery thereof. Inwardly directed walls with arcuate shaped inner end portions extending generally toward one another are formed on the shoulders. The tire is formed to include inverted bead portions which mount and seal around the respective inner end portions, accommodating the positioning of the run-flat shoulders within the tire.

1 Claim, 2 Drawing Figures

RUN-FLAT TIRE AND WHEEL ARRANGEMENT WITH INVERTED BEAD INTERLOCK

This invention relates generally to pneumatic tires and wheels and, more particularly, to tire and wheel assemblies which have run-flat characteristics.

Various arrangements have been suggested for providing wheels having integral or detachable rim components which extend inside pneumatic tires to support the weight of the vehicle in the event of a deflated tire, for example, Omeron U.S. Pat. No. 2,844,180; Scott U.S. Pat. No. 3,028,900; and Drazin U.S. Pat. No. 3,212,548.

The object of this invention is to provide an improved tire and wheel assembly having internally positioned rim means suitable for rotatably supporting the carrying vehicle in the event of a "flat tire" condition.

Another object of the invention is to provide an improved tire and wheel combination wherein the rim of the wheel has run-flat shoulders formed thereon adapted to extend into the interior portion of the tire.

A further object of the invention is to provide a tire and wheel combination wherein the rim of the wheel is formed to include run-flat shoulders extending into the interior of the tire, flanges formed to extend radially inwardly from the shoulders, with arcuate shaped inner end portions formed on the inner end of the flanges, such that a tire with a reversed or inverted bead arrangement is sealably mounted around the inner end portions radially inwardly of the run-flat shoulders.

Figure 2:
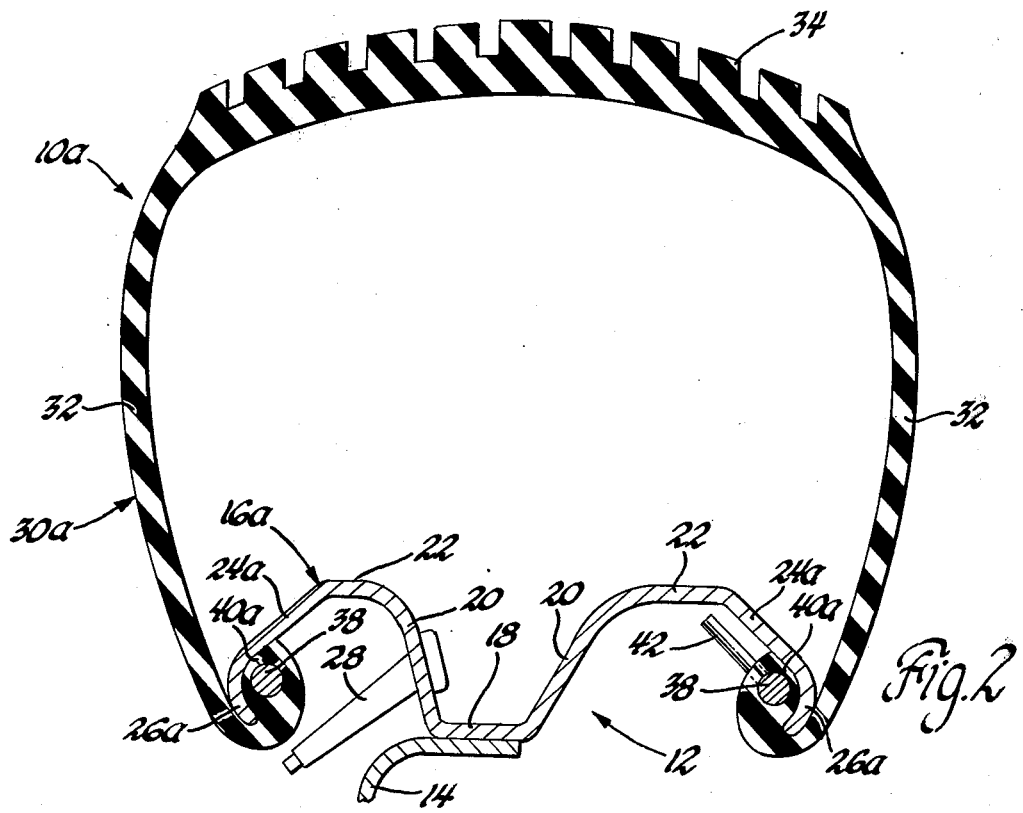

These and other objects and advantages of the invention will be more apparent when reference is made to the following description and accompanying drawings, wherein:

FIG. 1 is a cross-sectional view of a tire and wheel combination embodying the invention; and FIG. 2 is a cross-sectional view of an alternate embodiment of the FIG. 1 structure.

Referring now to the drawings in greater detail, FIG. 1 illustrates a wheel and tire combination 10 including a wheel 12 having an annular radially extending wheel disc 14 and a rim 16 including a cylindrical central portion 18 secured to the outer peripheral surface of the wheel disc. A pair of radially outwardly diverging annular walls 20 are formed on opposite edges of the central portion 18 and extend a predetermined distance radially outwardly therefrom.

An annular run-flat shoulder 22 is formed on the radially outer end of each of the walls 20, extending in opposite directions therefrom. A radially inwardly directed annular wall 24 is formed on the outer end of each of the shoulders 22. An annular mounting flange 26 having an arcuate shaped cross section is formed on the inner end of each of the walls 24, and directed toward the central portion 18. A tire inflation valve 28 is mounted through one of the outwardly diverging annular walls 20.

A tire carcass 30 includes oppositely disposed annular sidewalls 32 supporting the usual outer annular tread portion 34. An annular inverted loop 36 is formed on the radially inner end of each of the sidewalls 32. An annular bead 38 is formed in each of the inverted loops 34 adjacent the distal end 40 thereof. Each loop 36 is formed so as to mount around the respective arcuate shaped mounting flange 26 such that the beaded end 40 is sealed against the inner surface of the arcuate shaped mounting flange.

One or more metal tabs 42 of a predetermined length may be formed on one of the beads 38 so as to extend through the wall of the loop 36 toward the wall 20 of the wheel in order to provide for easy removal of the tire from the wheel.

In operation, it is apparent that should the tire 30 become deflated for any reason, the sidewalls 32 would collapse until the outer tread portion 34 abuts against the annular run-flat shoulders 22, the latter being of such a diameter that the vehicle could continue to be driven, the shoulders and the adjacent tread portion of the tire serving as a suitable wheel for rotatably supporting the vehicle.

FIG. 2 illustrates an alternate embodiment of a wheel and tire combination 10a similar to the FIG. 1 arrangement 10, except that particular elements thereof are formed with different configurations. Those elements which are substantially the same in the two structures bear the same reference numerals. A principle difference between the FIG. 2 and FIG. 1 structures is that the radially inwardly directed walls 24a of FIG. 2 are formed at a shallower angle than the walls 24 of FIG. 1, such that the tire sidewalls 32 do not abut thereagainst, as in the case of the FIG. 1 structure. However, the shoulders 22, in conjunction with the outer tread 34 would serve as a run-flat wheel in a manner similar to the shoulders and tread of the FIG. 1 arrangement. Also, the mounting flanges 26a of the rim 16a and the beaded ends 40a of the tire 30a cooperate in a different attitude than the comparable elements of the FIG. 1 structure, but with an equally effective sealing result.

It is apparent that, should a flat tire occur, the invention provides means whereby the operator of a vehicle bearing either of the above wheel and tire constructions could continue travelling, for example, to the nearest service station.

While but two embodiments of the invention have been shown and described, other modifications thereof are possible.

The embodiments of the invention in which an exclusive property or privilege is claimed are defined as follows:

1. A wheel and beaded pneumatic tire combination, said wheel comprising an annular wheel disc, a one-piece rim for said wheel disc providing the sole mounting for said tire, said rim including a centralized annular channeled portion having an inner annular base secured to the outer periphery of said wheel disc, said channeled portion further having a pair of inner annular walls which diverge outwardly with respect to one another to a predetermined distance outwardly from said base, said rim further including a pair of cylindrical run-flat shoulder portions extending laterally outwardly from the outer portions of each of said diverging walls to provide annular rigid wheels for load support in the event of deflations of said tire, each of said shoulder portions having an annular outer side flange laterally offset from a corresponding one of said inner annular walls, each of said outer side flanges extending generally downwardly from the outermost extremity of said shoulder portion and providing a flat surface to a point where it terminates in an inwardly hooked annular tire-bead channel of approximately 180°, a tire inflation valve operatively mounted in one of said annular side flanges providing an air passage to the interior of said tire, said tire comprising a carcass, said carcass having annular side walls with interior surfaces contacting said side flanges correspondingly therewith, said carcass having an outer annular tread portion adapted to engage a roadway, said carcass further having an annular inverted loop formed on the inner end of each of said side walls, said carcass having an annular bead formed in each of said inverted loops, said inverted loops being mounted in said tire- bead channels of said rim such that said loops are speced radially inwardly from said run-flat shoulders and are pneumatically sealed against the inner surfaces of said side flanges.

* * * * *